(12) United States Patent
Golovkin

(10) Patent No.: US 9,087,195 B2
(45) Date of Patent: Jul. 21, 2015

(54) SYSTEMS AND METHODS FOR DETECTING OBFUSCATED MALWARE

(75) Inventor: Maxim Y. Golovkin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 1196 days.

(21) Appl. No.: 12/500,630

(22) Filed: Jul. 10, 2009

(65) Prior Publication Data

US 2011/0010697 A1 Jan. 13, 2011

(51) Int. Cl.
  *G06F 21/00* (2013.01)
  *G06F 15/16* (2006.01)
  *G06F 21/56* (2013.01)

(52) U.S. Cl.
  CPC .................................. *G06F 21/563* (2013.01)

(58) Field of Classification Search
  CPC ....................................................... G06F 21/563
  See application file for complete search history.

(56) References Cited

U.S. PATENT DOCUMENTS

| | | | | |
|---|---|---|---|---|
| 5,230,050 | A * | 7/1993 | Iitsuka et al. | 717/145 |
| 5,964,889 | A | 10/1999 | Nachenberg | |
| 6,760,906 | B1 * | 7/2004 | Odani et al. | 717/149 |
| 6,959,372 | B1 * | 10/2005 | Hobson et al. | 711/168 |
| 7,069,583 | B2 | 6/2006 | Yann et al. | |
| 7,069,589 | B2 | 6/2006 | Schmall | |
| 7,269,649 | B1 * | 9/2007 | Brown et al. | 709/224 |
| 7,349,931 | B2 | 3/2008 | Horne | |
| 7,370,361 | B2 | 5/2008 | de los Santos et al. | |
| 7,624,449 | B1 * | 11/2009 | Perriot | 726/24 |
| 7,739,740 | B1 * | 6/2010 | Nachenberg et al. | 726/25 |
| 2002/0026478 | A1 * | 2/2002 | Rodgers et al. | 709/205 |
| 2003/0079145 | A1 * | 4/2003 | Kouznetsov et al. | 713/200 |
| 2008/0271147 | A1 | 10/2008 | Mohanan et al. | |
| 2009/0119515 | A1 * | 5/2009 | Nicolson et al. | 713/190 |

OTHER PUBLICATIONS

European Search Report from the counterpart EP Application No. 10168401.

* cited by examiner

*Primary Examiner* — Charles C Agwumezie
(74) *Attorney, Agent, or Firm* — Arent Fox LLP; Michael Fainberg

(57) ABSTRACT

Disclosed are systems, methods and computer program products for efficient and reliable analysis, optimization and detection of obfuscated malware. One disclosed example method for malware detection includes loading an executable software code on a computer system and disassembling the software code into an assembly language or other low-level programming language. The method then proceeds to simplifying complex assembly instructions and constructing a data flow model of the simplified software code. The dependencies and interrelations of code elements of the data flow model are analyzed to identify obfuscated software codes therein. The identified obfuscated codes are then optimized. Based on the results of optimization, determination is made whether the software code is malicious and/or whether further antimalware analysis of the optimized software code is necessary.

23 Claims, 14 Drawing Sheets

SYSTEMS AND METHODS FOR DETECTING OBFUSCATED MALWARE

TECHNICAL FIELD

The present disclosure relates generally to the field of malware detection and, in particular, to systems and methods for analyzing, optimizing and detecting obfuscated malware.

BACKGROUND

The growing sophistication and rapid proliferation of malicious software (i.e., malware) presents an ever-increasing security threat to personal computers and enterprise computer systems worldwide. To combat the spread of malware, such as viruses, worms, Trojan horses and the like, various malware detection techniques have been developed by the antimalware industry. These techniques are generally based on principles of signature matching in which a software code is compared with a dictionary of know viral codes, or heuristic analysis in which a software is emulated and analyzed for patterns of malicious behavior. However, these techniques often fail when presented with obfuscated malware in which the software code is modified (or obfuscated) making it difficult to analyze. As a result, the antimalware programs fail to detect the obfuscated malware or spend such a significant time and system resources on analysis of the obfuscated software that the detection process becomes extremely inefficient.

Accordingly, there is need for an effective and efficient mechanism for analyzing an obfuscated software code and for detecting malicious codes therein.

SUMMARY

Disclosed herein are systems, methods and computer program products for efficient and reliable analysis, optimization and detection of obfuscated malware.

In one example embodiment, a method for malware detection includes loading an executable software code on a computer system. The software code is then divided into a plurality of code blocks each of which is sequentially (or in parallel) loaded into one or more memory buffers. The method further includes disassembling the software code in the memory buffer into the assembly language or other low-level programming language known to those skilled in the art. Any complex assembly language instructions may then be simplified into basic instructions. The method may then proceed to constructing a data flow model of a simplified software code and analyzing dependencies and interrelations of code elements of the data flow model to identify obfuscated software codes therein. The identified obfuscated codes may then be optimized. Finally, based on results of code optimization, a determination is made whether the software code is malicious and/or whether further analysis of the optimized software code using, for example, signature matching and/or heuristic analysis techniques is necessary.

In another example embodiment, a method for malware detection includes loading at least a portion of a software code into a system memory. The software code is then converted into a low-level programming language. The software code is then simplified. The dependencies and interrelations between the instructions in the simplified software code are analyzed to identify obfuscated software codes therein. The identified obfuscated codes may then be optimized. The optimization include removing dead codes and optimizing distributed calculations, reverse operations, constant calculations, transfer instructions, memory calls, flag operations, and branch and cycle instructions. Finally, an optimized software code is recompiled and analyzed using signature matching and/or heuristic analysis malware detection techniques to determine whether the software code is malicious.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings.

DESCRIPTION OF EXAMPLE EMBODIMENTS

Example embodiments are described herein in the context of systems and methods for analyzing, optimizing and detecting obfuscated malicious software (also referred to herein as malware). Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The various embodiments of algorithms for analysis, optimization and detection of obfuscated malware disclosed herein may be implemented using hardware, software, firmware or a combination thereof and may be implemented in various computing systems, such as a general purpose personal computer (PC), a laptop computer, an application server, a network firewall, a router or a wireless access point. In addition, the disclosed algorithms may be implemented on a distributed computing system comprising a plurality of networked server computers operating in parallel for the purpose of malware detection, furthermore, the disclosed algorithms may be implemented in software running on consumer electronic devices, game consoles, mobile phones, personal digital assistants or other devices that may be exposed to malware.

Figure 1:
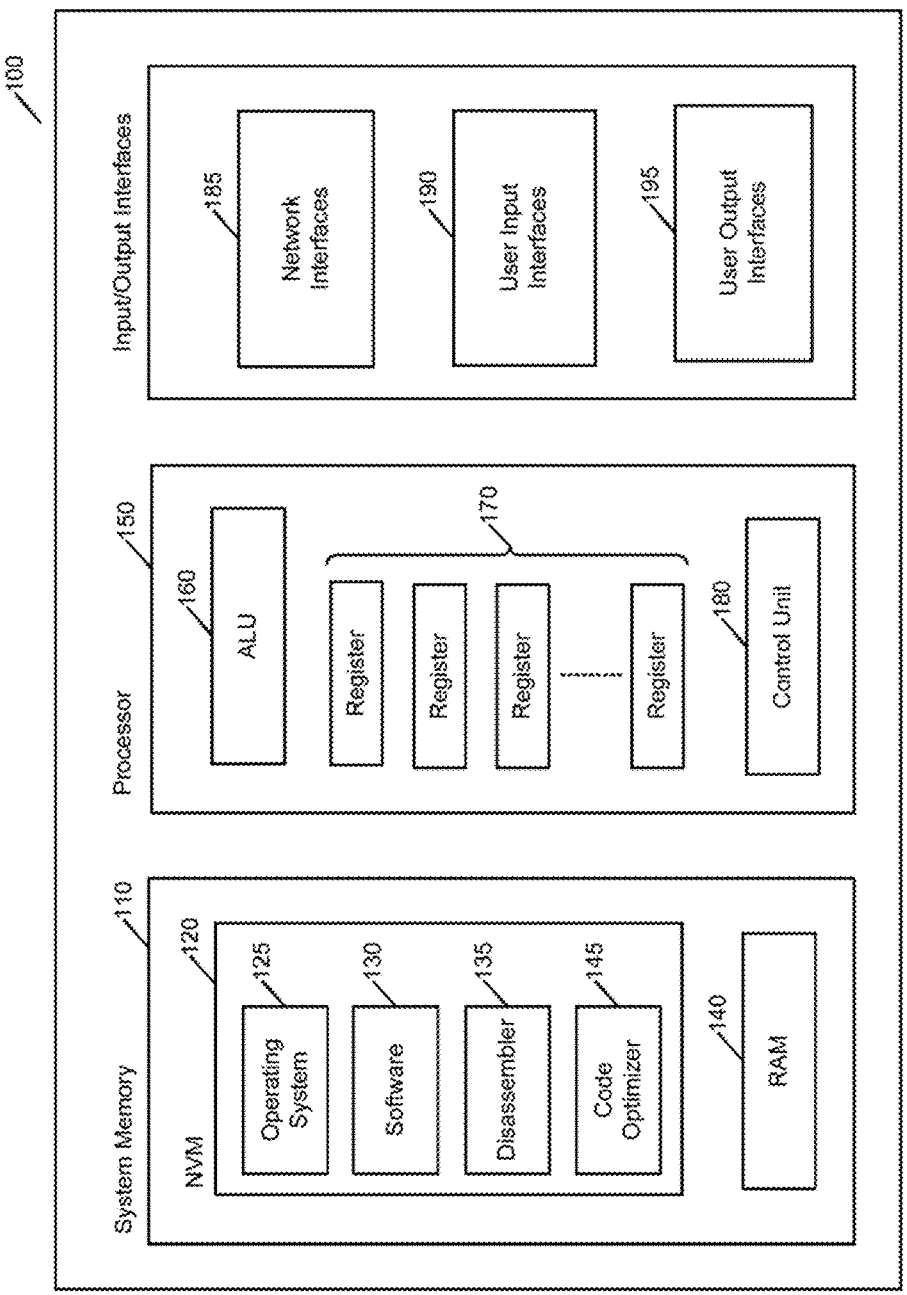
FIG. 1 illustrates a schematic diagram of a computer system in accordance with one example embodiment.

FIG. 1 illustrates a schematic diagram of an exemplary computer system suitable for implementing various embodiments of algorithms for analyzing, optimizing and detecting obfuscated malware. Generally, a computer system 100 includes at least one central processing unit (CPU) 150, an internal system memory 110, various network communication interfaces 185, and various internal or external user input and output devices 190 and 195, respectively. The components of the computer system 100 may be interconnected by a system bus (not shown). The computer system 100 may also include antimalware software 130 that implements the algorithms for analyzing, optimizing and detecting an obfuscated malware disclosed herein. Those of ordinary skill in the art will appreciate that depiction of computer system 100 herein is simplified and the system 100 may include other components essential for operation thereon.

In one example embodiment, the processor 150 may include an arithmetic logic unit (ALU) 160, a plurality of registers 170 and a control unit 180. The ALU 160 is typically used for performing basic arithmetic operations, such as addition, subtraction and comparison, and various complex operations dependent on the specific architecture of the processor 150. Registers 170 are memory locations used to temporary store values of internal processor operations, such as the address of the instructions being executed and the data being processed by the CPU 150. Registers 170 are typically denoted as EAX, EBX, ECX, EDX, ESI and EDI. Registers 170 are usually 32 bits or 64 bits long, but may be shorter or longer depending on the specific computer architecture, as know to those of ordinary skill in the art. Control unit 180 controls operation of the processor 150 by analyzing and executing software instructions. The instruction set architecture of the CPU 150 may be a general purpose RISC architecture (e.g., MIPS, PowerPC®, Precision Architecture or SPARK), an embedded RISC architecture (e.g., ARM, Hitachi SH, MIPS 16 Thumb), a CISC architecture (e.g., Intel 80×86, IBM 360/370 and VAX) or other types of processor architectures know to those of ordinary skill in the art.

In one example embodiment, system memory 110 may include a non-volatile memory (NVM) 120, a random access memory (RAM) 140 and various other types of secondary internal or external storage devices, such as a CD-ROM, DVD-ROM, tape drives and the like. The NVM 120 may include a solid state, magnetic or optical drive, EPROM, EEPROM and Flash memory. The NVM 120 may be used to store an operating system (OS) 125 and various software programs, including an antimalware program(s) 130 that is used to analyze and detect malware on system 100 in accordance with principles disclosed herein. The OS 125 may include a DOS®, Windows®, Mac® OS, Unix®, Linux® or other types of operating systems, including multi-tasking operating systems and the like. The RAM 140 may include static RAM (SRAM), dynamic RAM (DRAM) and other types of volatile memory known to those of ordinary skill in the art for storing runtime program and application data.

In one example embodiment, the communication interfaces 185 may include various serial or parallel ports, such as a USB, FireWire®, PCMCIA and the like, a wired network interface, such as a telephone or cable modem, Ethernet card or the like, a wireless interfaces, such as a cellular, Wi-Fi, Bluetooth® or other radio or optical interface. The user input devices 190 may include a mouse, a keyboard, a microphone, a remote controller or other type of controller. The user output devices 195 may include a display, a printer, audio speakers or other types of external or internal device. The communication interfaces 185 and the input/output interfaces 190, 195 may be used to load various computer programs, i.e. software, into the RAM 140 of the system 100 for malware analysis thereof. Interfaces 185 also enable the computer system 100 to communicate with other computer systems or networked databases, which may provide additional processing capabilities or malware knowledge databases for malware analysis.

To facilitate malware analysis of software loaded on the computer system 100, the system may include a disassembler 135 in accordance with one example embodiment. The disassembler 135 may be a component of the antimalware program 130. The disassembler 135 translates executable programs loaded on the system 100 into the assembly language code for further analysis of the program code by the antimalware software 130. An assembly language is a low-level language for programming computers. It implements a symbolic representation of the numeric machine codes and other constants needed to program a particular CPU architecture. Alternatively, other techniques known to those of ordinary skill in the art may be used to convert an executable program into other formats or low-level programming language suitable for analysis and optimization thereof in accordance with the principles disclosed herein.

Figure 14:
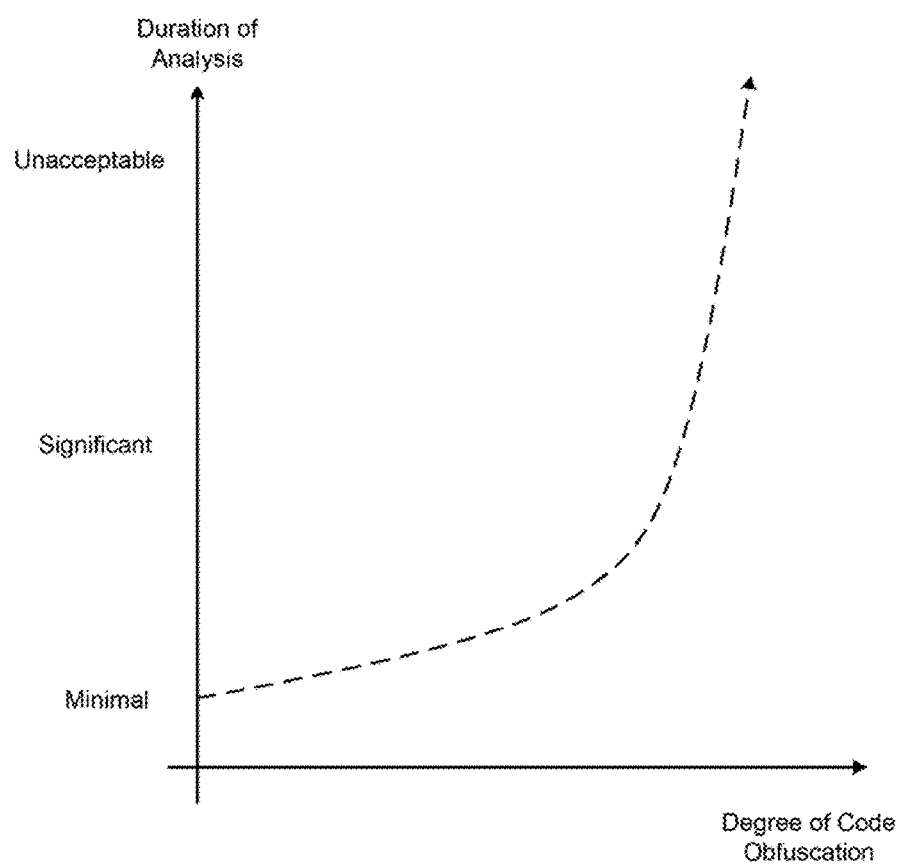
FIG. 14 depicts in a graphic form a relationship between the degree of code obfuscation and the time it takes for a typical antimalware program

As indicated above, obfuscated software significantly complicates the process of analyzing and detecting malicious codes therein using know antimalware techniques, such as signature matching, heuristic analysis and others. FIG. 14 depicts a graph of the relationship between the degree of code obfuscation and the time it takes for a typical antimalware program running on the system 100 to analyze such an obfuscated code. As evidenced by the graph, as the degree of code obfuscation increases, the time to analyze the obfuscated code increases nearly exponentially, quickly moving from minimal to significant and then to unacceptable both for typical PC-based antimalware programs and for sophisticated and powerful antimalware applications used in laboratories by antivirus software developers and others malware experts.

Figure 2:
FIG. 2 illustrates a sample obfuscated software code in accordance with one example embodiment.

FIG. 2 provides art example obfuscated software code written in C++ programming language. In particular, function DWORD contains the following obfuscated code.

M[]=D;
T+=M[i];

M[i]=D;
T-=M[i];

The complied version of the DWORD function is reproduced on the right side of the FIG. 2. The code may be compiled using any known compiler on computer system 100, such as Microsoft Visual C/C++ compiler or others. The obfuscated code above is represented as the following assembly language instructions:

```
ADD     EAX, ECX
SUB     EAX, ECX
```

This code is considered to be obfuscated because after the addition (ADD) and subtraction (SUB) operations are executed by the processor 150, the value of the register EAX does not change, which indicates that these instructions were redundant and their execution was unnecessary. While this obfuscation example is relatively simple, extensive use of this and other obfuscation techniques in a malware would significantly impede processing and analysis of the malicious software by an antimalware program. Therefore, optimization of the obfuscated software code may be desirable to improve performance and efficiency of the detection process.

Figure 3A:
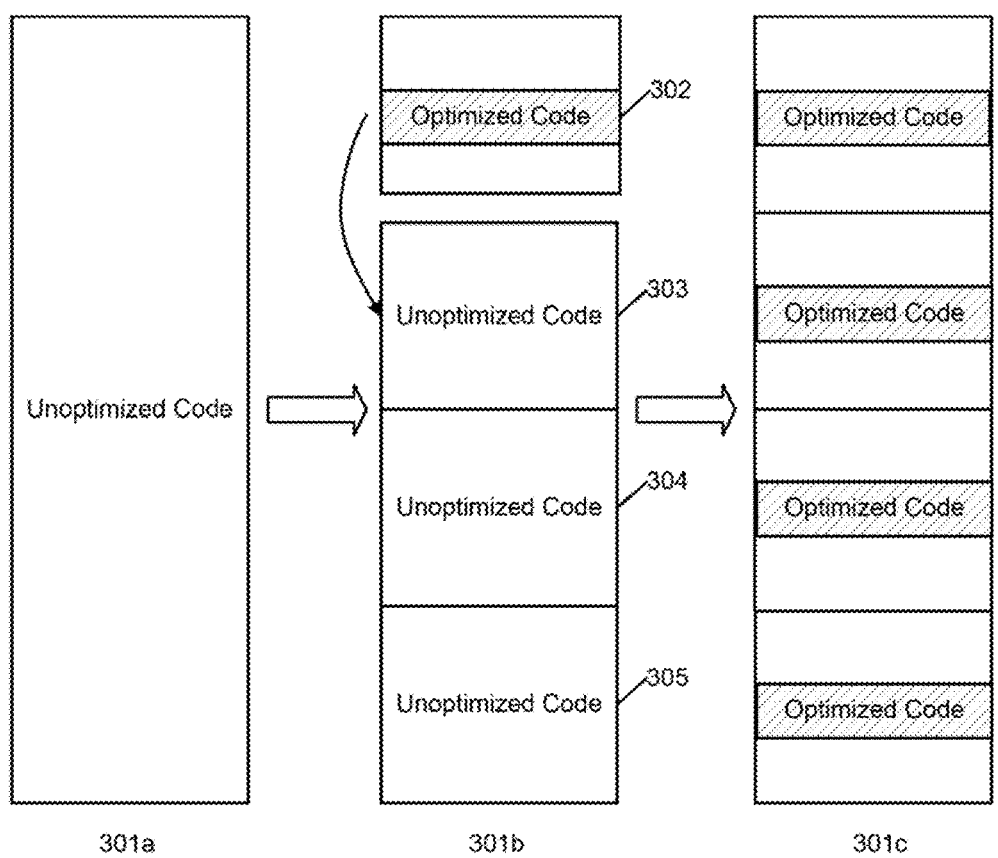
FIG. 3a illustrates a high-level schematic diagram of a process for code optimization in accordance with one example embodiment.

To accomplish these goals, the computer system 100 includes a code optimizer 145 in accordance with one example embodiment. The code optimizer 145 may be a component of the antimalware program 130. FIG. 3a depicts a high-level schematic diagram of the code optimization process in accordance with one example embodiment. At step 301, an unoptimized executable or object software code is loaded by the antimalware program 130. At step 301, the software code may be divides into code blocks 302, 303, 304, etc. The size of each code block may range, for example, from 400 to 1000 bytes, but may vary depending on the system and application requirements or other parameters know to those of skill in the art. As shown in step 301b-301c, code blocks are optimized sequentially (or in parallel) by the code optimizer 145. The optimized code is typically smaller in size because it contain fewer instructions and thus easier to analyze by the antimalware program 130 than the original unoptimized code. In one example embodiment, the code blocks may be analyzed for malware in real time as the optimized code blocks are being generated, so that the antimalware program 130 may terminate analysis of the software code as soon as it determines that the code is malicious (or benign) and before the entire software code is optimized, which saves system resources and time.

Figure 3B:
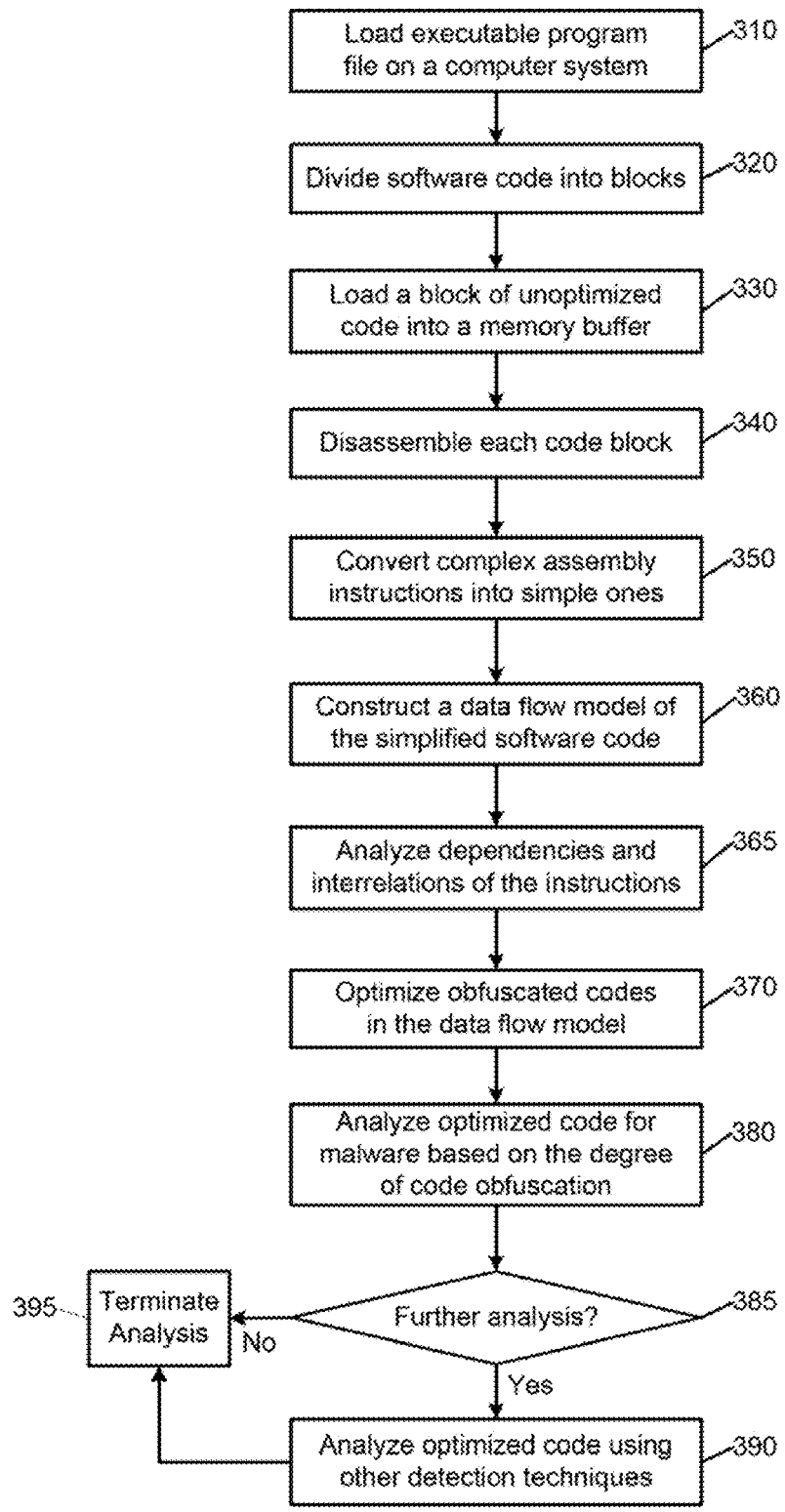
FIG. 3b illustrates a detailed flow diagram of the process for code optimization in accordance with another example embodiment.

FIG. 3b depicts a more detailed flow diagram of the code optimization process in accordance with one example embodiment. At step 310, an executable program file 130 is loaded on computer system 100 to be analyzed by an anti-malware program. At step 320, the antimalware program divides the loaded executable software code into several code blocks and, at step 330, loads the code blocks into one or more memory buffers in the RAM 140 of system 100. At step 340, the disassembler 135 disassembles each code block into the assembly language instructions, or other low-level programming language instructions know to those of ordinary skill in the art. At step 350, the code optimizer 145 analyzes substantially in real time each code block and replaces complex assembly instructions with simple (or basic) instructions, such as ADD, SUB, MOV, OR and other basic assembly instructions. For example, a complex PUSH EAX instruction may be broken into a set of basic instructions as shown below:

```
SUB ESP, 4
MOV [ESP], EAX
```

Figure 5:
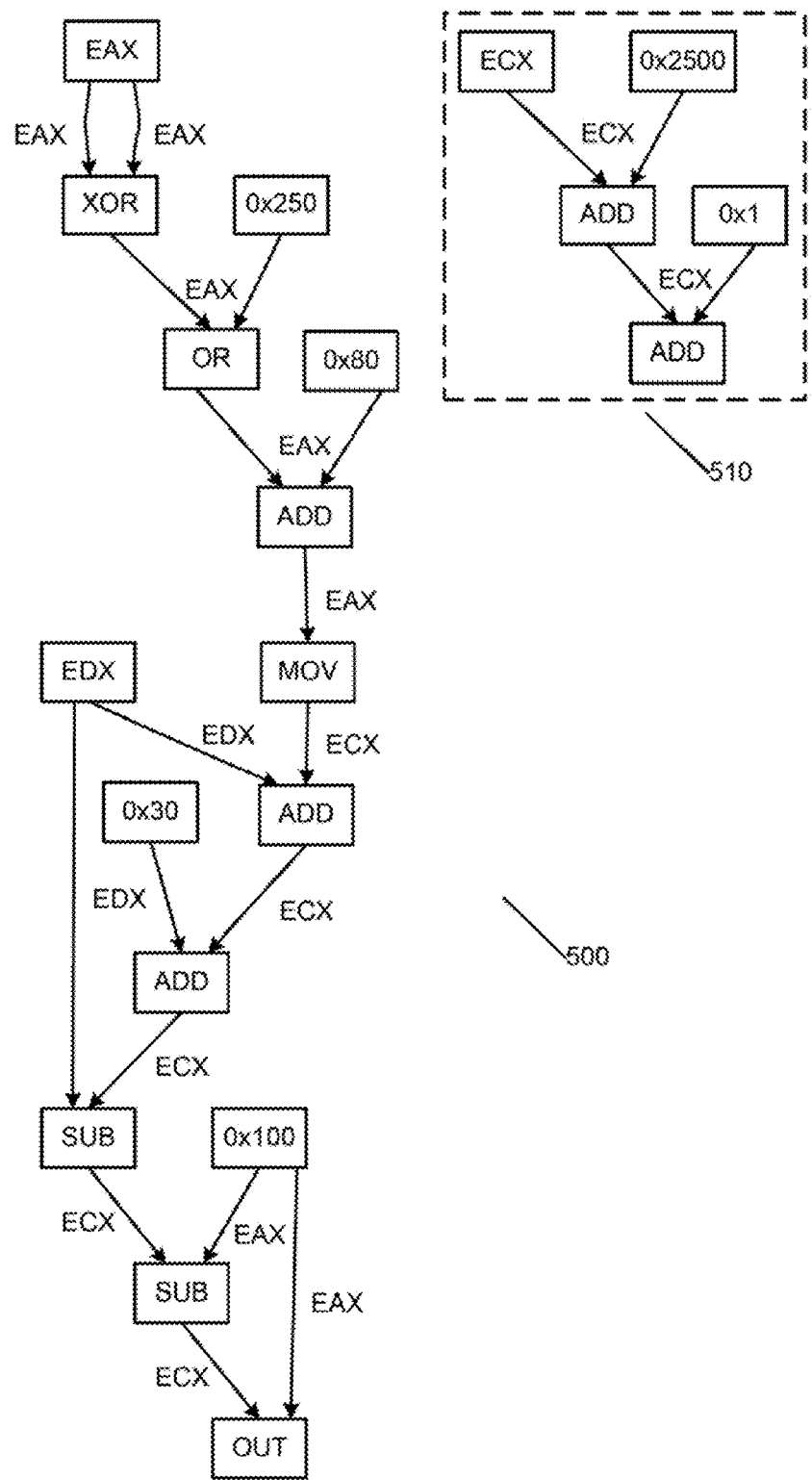
FIG. 5 illustrates an example of a data flow model of an obfuscated software code in accordance with one example embodiment.

At step 360, code optimizer 145 may construct a data flow model of the simplified software code for one or more code blocks. The data flow model identifies dependencies and interrelations between code elements of the simplified software code. FIG. 5 illustrates one example of a data flow model. At steps 365 and 370, the optimizer 145 may analyze the data flow model, identify obfuscated codes therein, and optimize the obfuscated codes in the data flow model. In general, the optimization process involves analysis of the dependencies and interrelations between the code elements in the data flow model. The analyzed code elements include operations, such as XOR, ADD, INC, etc., and operands, i.e., the values being operated on, of one or more assembly instructions in one or more code blocks. The data flow model assists the optimizer 145 to perform such an analysis of the software code. In one example embodiment, the optimizer 145 may construct a separate data flow model for each code block. In another embodiment, a common data flow model incorporating instructions from several code blocks may be constructed. Yet in another embodiment, the optimizer 145 may directly analyze and optimize the simplified software code without the use of any data flow model.

At step 380, the antimalware program compares the optimized software code provided by the optimizer 145 with the original unoptimized code to measures the degree of code obfuscation. For example, the antimalware program may compare the number of instructions in the original disassembled software code with the number of instructions in the optimized software code. Based on the degree of code obfuscation, the antimalware program can decide whether the analyzed software is malicious. For example, if the software code is heavily obfuscated, e.g., an excess of 50% of the code was obfuscated, the antimalware program declares that the software is malicious due to its apparent attempt to hide its functionality using code obfuscation. On the other side, if the code is not obfuscated or only lightly obfuscated, e.g., below 10%, the antimalware program may declare the software to be non-malicious.

At step 385, the antimalware program may decide based on the degree of code obfuscation whether an additional malware analysis of the software code is necessary in accordance with one example embodiment. At step 390, the antimalware program may further analyze the software code having a significant percent of obfuscated code using conventional malware detection techniques, such as such signature matching, heuristic analysis or others. To that end, the antimalware program may recompile the optimized software code using C++, Java or other type of compiler and submit it for further analysis. If signature matching is used, the optimized software code may be compared with a dictionary of know viral codes maintained by the antimalware program in a malware databases. If a heuristic analysis is used, the optimized software may be emulated and analyzed for patterns of malicious behavior. Example techniques of heuristic analysis are disclosed in commonly owned U.S. patent application Ser. No. 11/866,302 filed Oct. 2, 2007 entitled SYSTEM AND METHOD FOR DETECTING MULTI-COMPONENT MALWARE, which is incorporated by reference herein. Alternatively or additionally, the optimized software code may be sent for review to a human malware expert or a group of experts. Example techniques of expert analysis are disclosed in commonly owned U.S. patent application Ser. No.

10/323,835 filed Nov. 26, 2008 entitled SYSTEM AND METHOD FOR COMPUTER MALWARE DETECTION, which is incorporated by reference herein. If a malware is detected in the optimized software code, the original software program may be classified, as viruses, worms, Trojan horses or the like, and quarantined or removed from the system at step 395. It should be appreciated that the optimized software code is much easier to analyze regardless of which malware detection technique is being used.

Figure 4:
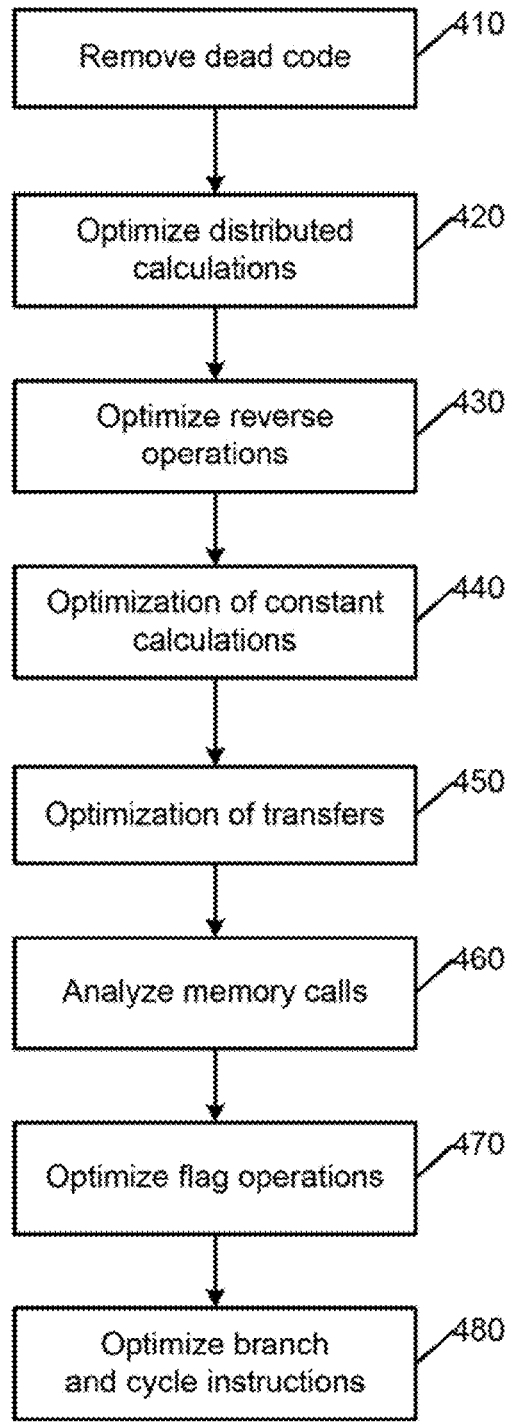
FIG. 4 illustrates various types of obfuscated codes that may be optimized in accordance with one example embodiment.

FIG. 4 depicts several types of obfuscated codes that may be optimized by the optimizer 145 in accordance with various example embodiments. As depicted, the optimizer 145 may perform the following optimization processes: remove dead code 410, optimize distributed calculations 420, reverse operations 430, constant calculations 440 and transfer instructions 450. It may also optimize memory calls 460, flag operations 470 and branch and cycle instructions 480. The order in which these instructions are optimized by the optimizer 145 is merely illustrative, and the optimization may be performed in a different order. Also, depending on the system and application requirements, the optimizer 145 may select not to perform some of the depicted optimization processes and instead perform other known optimization techniques.

Examples of the above optimization processes will be described in greater detail below with reference to FIGS. 5-13 and the following unoptimized, simplified software code.

| | |
|---|---|
| XOR | EAX, EAX |
| ADD | ECX, 2500h |
| OR | EAX, 250h |
| ADD | EAX, 80h |
| INC | ECX |
| MOV | ECX, EAX |
| ADD | ECX, EDX |
| ADD | ECX, 30h |
| SUB | ECX, EDX |
| MOV | EAX, 100h |
| SUB | ECX, EAX |

FIG. 5 depicts an example of a data flow model 500 of the software code above, which may be constructed by the code optimizer 145. The analysis of the dependencies and interrelations between the instructions of the model 500 indicates that the software code includes dead code 510 that does not participate in the execution of the software and merely wastes system resources. The dead code 510 corresponds to the following instructions:

| | |
|---|---|
| ADD | ECX, 2500h |
| INC | ECX |

The optimizer 145 may identify these instructions as a dead code because they are followed by the following MOVE operation, which erases results of the ADD and INC instructions:

| | |
|---|---|
| MOV | ECX, EAX |

Thus, the optimizer 145 may remove the ADD and INC instructions from data flow model 500.

Figure 6:
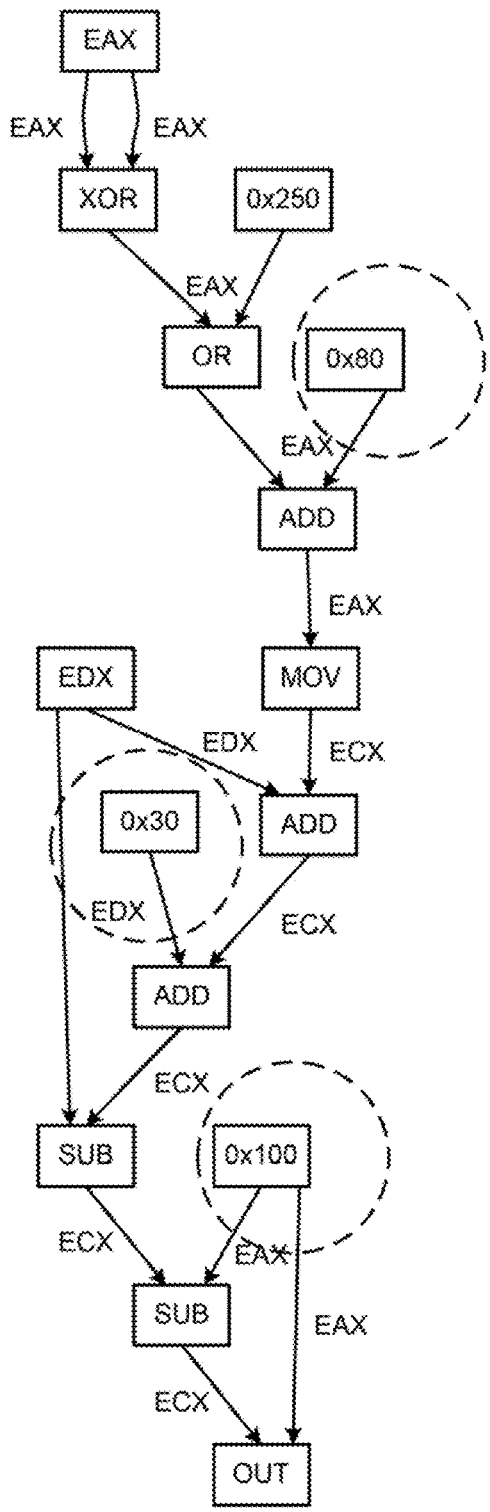
FIG. 6 illustrates an example of distributed calculation operations in accordance with one example embodiment.

FIG. 6 depicts an example of distributed calculations in model 500, which include addition (ADD) and subtraction (SUB) of constant values (circled in the drawing) and which are reproduced below:

| | |
|---|---|
| ADD | EAX, 80h |
| MOV | ECX, EAX |
| ADD | ECX, 30h |
| SUB | ECX, 100h |

These distributed calculations on constants can be calculated in advance by the optimizer 145 thereby further optimizing the software code 500.

Figure 7:
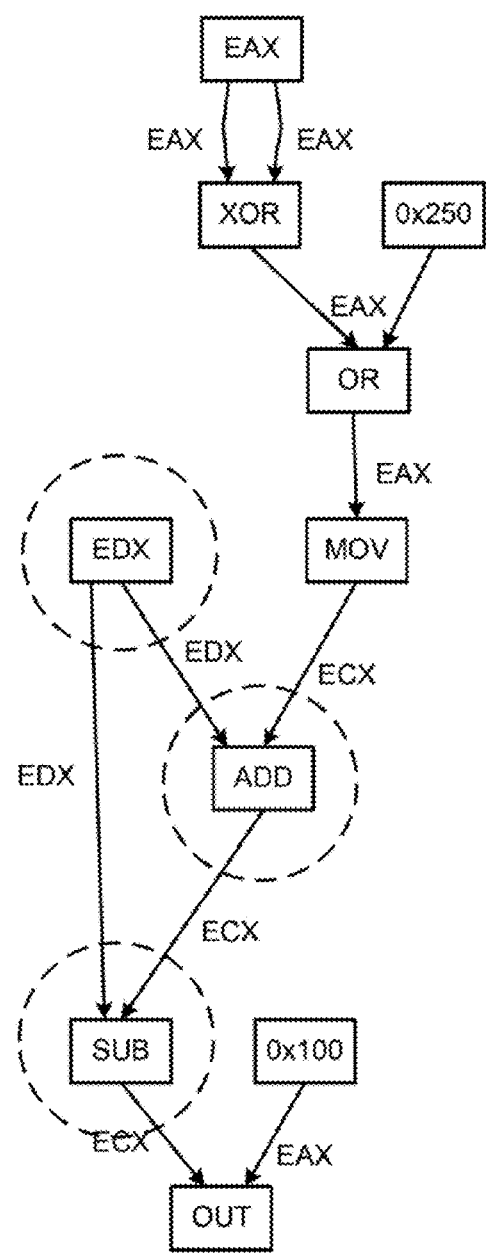
FIG. 7 illustrates an example of reverse calculation of variables in accordance with one example embodiment.

FIG. 7 depicts an example of reverse calculations on variables (circled in the drawing) in the model 500. The reverse calculations include instructions having the following type:

A=A÷B
A=A−B

In other words, reverse calculations are those that do not change the value of the variable A. In FIG. 7, such calculations are circled and include the following ADD and SUB instructions:

| | |
|---|---|
| ADD | ECX, EDX |
| SUB | ECX, EDX |

The code optimizer 145 can completely remove these instructions from the software code 500.

Figure 8:
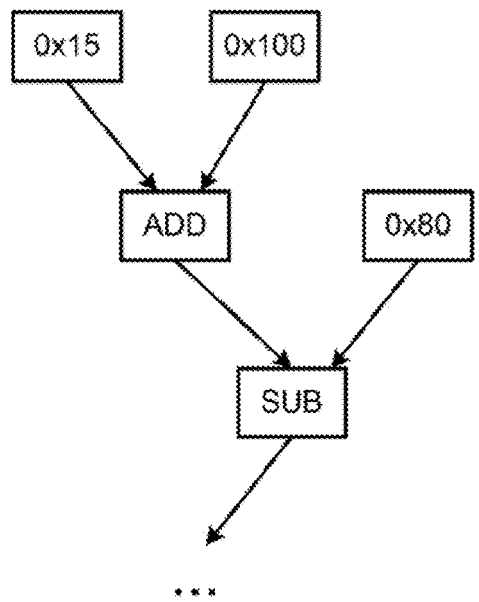
FIG. 8 illustrates an example of calculations on constant values in accordance with one example embodiment.

FIG. 8 depicts an example of calculations on constant values, which can be calculated in advance by the optimizer 145 in order to further simplify the software code. Such operations may include, but are not limited to, MOV, ADD and SUB operations depicted below:

| | |
|---|---|
| MOV | EAX, 15h |
| ADD | EAX, 100h |
| SUB | EAX, 80h |

Figure 9:
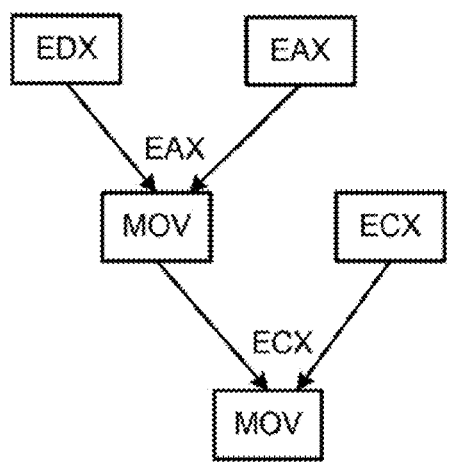
FIG. 9 illustrates an example of transfer instructions in accordance with one example embodiment.

FIG. 9 depicts an example of move operations, which include optimization of instructions of the following type: A=B and C=A, which can be optimized as: C=B. Examples of these instructions are provided in FIG. 9:

| | |
|---|---|
| MOV | EAX, EDX |
| MOV | ECX, EAX |

By analyzing dependencies and interrelations of the above instructions, the optimizer 145 may replace them with the following instruction

| | |
|---|---|
| MOV | ECX, EDX |

It should be noted that optimization can be performed only if the value of register EAX will not be subsequently used anywhere else in the program. However, if it is used somewhere else, the result of the optimization will then be as follows:

| | |
|---|---|
| MOV | EAX, EDX |
| MOV | ECX, EDX |

Figure 10:
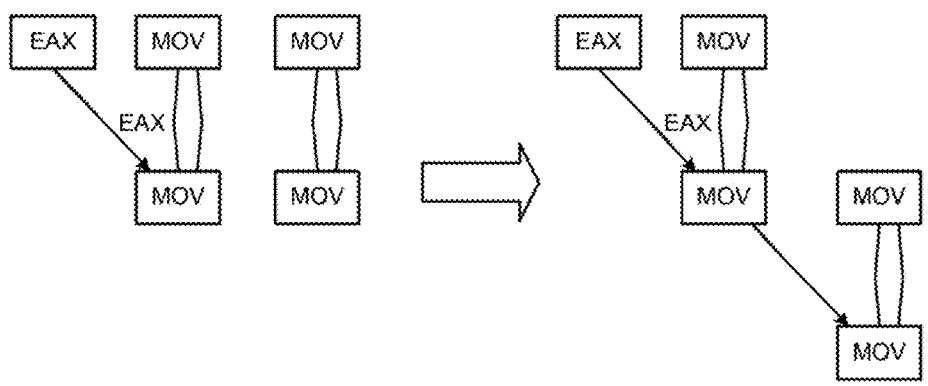
FIG. 10 illustrates an example optimization of memory call instructions in accordance with another example embodiment.

FIG. 10 depicts optimization of memory call instructions of the following type: *A=B and C=*A, which can be optimized as follows: C=B. The principle behind optimization of these instructions is to create new connections between nodes in the data flow model accessing memory in case these nodes access identical memory locations, in FIG. 10, such memory call operations are depicted as instructions

```
PUSH   EAX
POP    EAX
``` which, although executed successively, do not affect the value of the register EAX.

Figure 11:
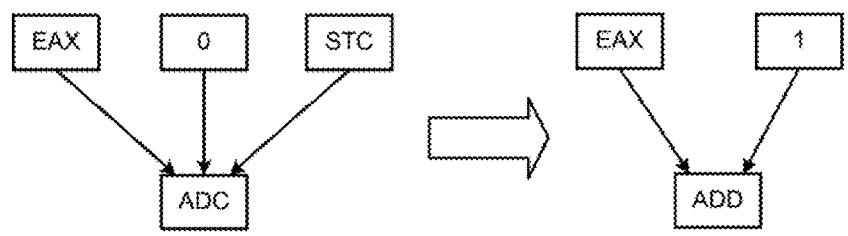
FIG. 11 illustrates an example optimization of flag instructions in accordance with one example embodiment.

FIG. 11 depicts optimization of the set flag instructions, such as instructions

```
STC
ADC    EAX, 0
``` which can be represented as the following optimized operation:

```
ADD    EAX, 1
```

Figure 12:
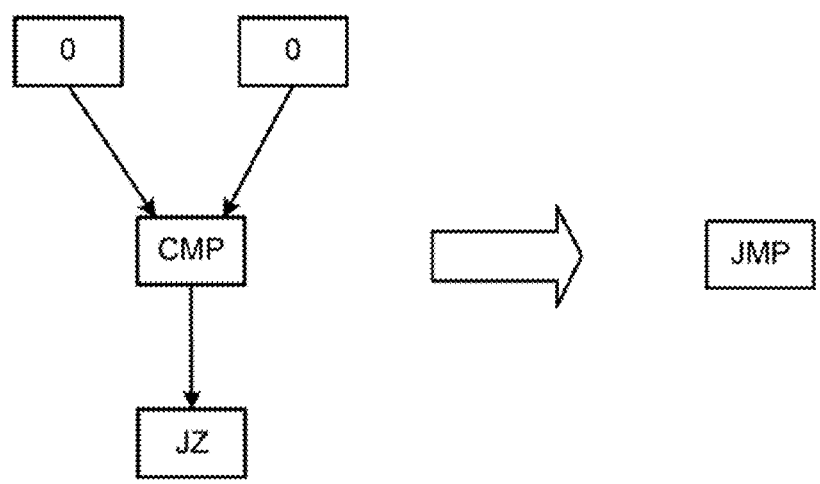
FIG. 12 illustrates an example of optimization of branch and cycle instructions in accordance with one example embodiment.

FIG. 12 depicts an example of optimization of the branches and cycle instructions. One such example may include conversion of transfer JZ (Jump-If-Zero) instruction into an unconditional transfer JMP, if it is known that the condition is always being performed. Thus, the JZ instruction if(1) {. . . } may be optimized into {. . . } instruction. In FIG. 12, this optimization is depicted in the following manner:

```
CMP    0, 0
JZ     [token]
``` which can be optimized as a single Jump instruction:

```
JMP    [token]
``` where [token] is the address of a pointer in the code of the computer program.

It should be noted that all of the examples of code optimization above are merely illustrative and the entire optimization algorithm may be based on the rules such as

A+0=A

A^A=0

Figure 13:
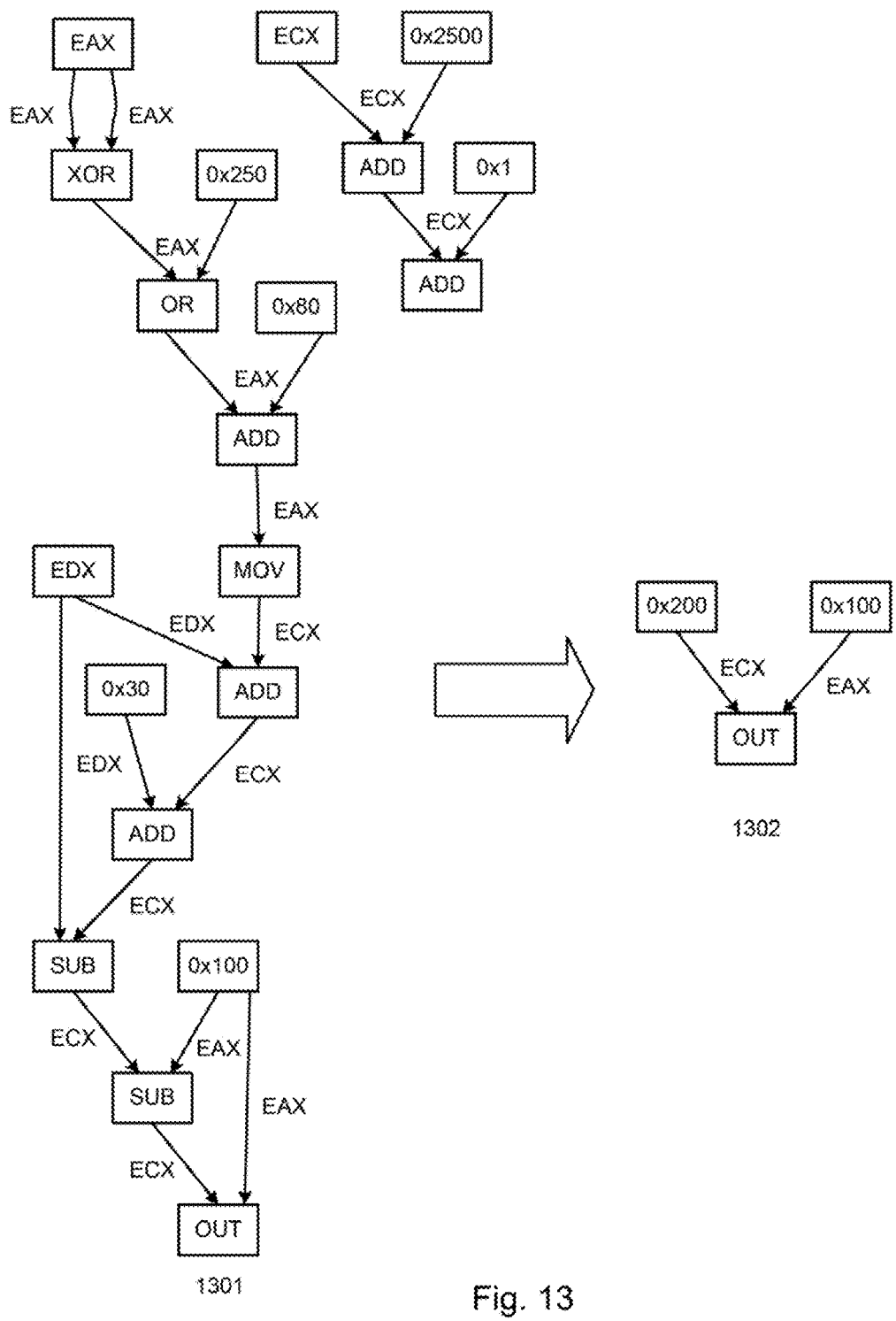
FIG. 13 illustrates the result of optimization of the obfuscated code in accordance with one example embodiment.

FIG. 13 depicts results of the above-described optimization algorithm on code 500. As indicated above, the original unoptimized code was as follows:

```
XOR    EAX, EAX
ADD    ECX, 2500h
OR     EAX, 250h
ADD    EAX, 80h
INC    ECX
MOV    ECX, EAX
ADD    ECX, EDX
ADD    ECX, 30h
SUB    ECX, EDX
MOV    EAX, 100h
SUB    ECX, EAX
``` whose data flow mode 1301 is identified in FIG. 13. A result of the optimization process is identified as an optimized data flow model 1302, which corresponds to the following code:

```
MOV    ECX, 200h
MOV    EAX, 100h
```

As a result of the optimization, the size of the software code may be reduced by as much as 85%.

In accordance with this disclosure, the components, process steps, and/or data structures described herein may be implemented using various types of operating systems, computing platforms, computer programs and programming languages. In addition, those of ordinary skill in the art will recognize that devices of a less general purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by a machine, they may be stored on a tangible medium such as a computer memory devices (e.g., ROM, PROM and BEPROM, Flash memory and the like), magnetic storage medium (e.g., tape, magnetic disk drive and the like), optical storage medium (e.g., CD-ROM, DVD-ROM and the like) and other types of program memory.

Although example embodiments of the software deobfuscation systems and methods have been described herein in connection with various malware detection techniques. The principles of software deobfuscation set forth herein are not limited to malware detection paradigm and may be readily implemented and applies without undue experimentation by those skilled in the art having benefit of this disclosure in other applications and technical fields.

Furthermore, it is to be understood that the phraseology or terminology used herein is for the purpose of description and not of limitation, such that the terminology or phraseology of the present specification is to be interpreted by the skilled in the an in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit, of this disclosure that many more modifications than mentioned above are possible without departing from the inventive concepts disclosed herein.

What is claimed is:

1. A computer-implemented method for detecting malicious software programs, the method comprising:
   dividing, by a hardware processor, a code of a software program into a plurality of code blocks of a predetermined size;
   performing, by the hardware processor, an optimization of one or more of the plurality of code blocks, wherein the optimization of a code block includes:
      generating a converted code block by disassembling the code block into a low-level programming language;
      generating a simplified code block by replacing complex assembly instructions in the converted code block with basic instructions;
      generating a data flow model of the simplified code block;

analyzing dependencies and interrelations of code elements of the data flow model;

identifying obfuscated software code elements in the simplified code block based on the analysis of the data flow model; and generating an optimized code block by changing or removing one or more identified obfuscated code elements in the simplified code block;

determining, by the hardware processor, a degree of code obfuscation of at least one optimized code block by comparing the number of instructions in the optimized code block with the number of instructions in the converted code block; and determining, by the hardware processor, whether the software program is malicious based on the degree of code obfuscation of at least one optimized code block and before completing the optimization of all code blocks of the software program.

2. The method of claim 1, further comprising:

determining, by the hardware processor, based on the degree of code obfuscation of at least one optimized code block, whether to further analyze the software program using at least one of malware signature matching and heuristic analysis.

3. The method of claim 1, wherein performing, by the hardware processor, an optimization of one or more of the plurality of code blocks includes one or more of:

performing sequentially the optimization of the plurality of code blocks; and performing in parallel the optimization of the plurality of code blocks.

4. The method of claim 1, wherein disassembling the code block into the low-level programming language includes disassembling the code block into assembly-language instructions to generate the converted code block.

5. The method of claim 1, wherein generating the optimized code block includes performing one or more code optimization techniques, including removing a dead code, optimizing a distributed calculation, optimizing a reverse operation, optimizing a constant calculation, optimizing a transfer instruction, optimizing a memory call, optimizing a flag operation, and optimizing a branch and a cycle instructions.

6. The method of claim 1, wherein determining, by the hardware processor, whether the software program is malicious based on the degree of code obfuscation, further includes:

providing, by the hardware processor, the optimized code to a human malware expert for further analysis.

7. The method of claim 5, wherein generating the optimized code block further includes selecting one or more optimization techniques based at least on requirements of the system that performs the code optimization.

8. The method of claim 2, further comprising:

classifying the malicious software program into one or more classes of malware; and performing one or more malware treatment actions.

9. A computer-based system for detecting malicious software programs, the system comprising:

a hardware processor;

a memory storing a software program that, when executed by the hardware processor, causes the hardware processor to:

divide a code of the software program into a plurality of code blocks of a predetermined size;

perform an optimization of one or more of the plurality of code blocks, including:

generate a converted code block by disassembling the code block into a low-level programming language;

generate a simplified code block by replacing complex assembly instructions in the converted code block with basic instructions;

generate a data flow model of the simplified code block;

analyze dependencies and interrelations of code elements of the data flow model;

identify obfuscated software code elements in the simplified code block based on the analysis of the data flow model; and generate an optimized code block by changing or removing one or more identified obfuscated code elements in the simplified code block;

determine a degree of code obfuscation of at least one optimized code block by comparing the number of instructions in the optimized code block with the number of instructions in the converted code block; and determine whether the software program is malicious based on the degree of code obfuscation of at least one optimized code block and before completing the optimization of all code blocks of the software program.

10. The system of claim 9, wherein to perform an optimization of one or more of the plurality of code blocks, the software program further causes the hardware processor to:

perform sequentially the optimization of the plurality of code blocks; or perform in parallel the optimization of the plurality of code blocks.

11. The system of claim 9, wherein disassembling the code block into the low-level programming language, the software program further causes the hardware processor to disassemble the code block into assembly-language instructions to generate the converted code block.

12. The system of claim 9, wherein to generate the optimized code block, the software program further causes the hardware processor to perform one or more code optimization techniques, including removing a dead code, optimizing a distributed calculation, optimizing a reverse operation, optimizing a constant calculation, optimizing a transfer instruction, optimizing a memory call, optimizing a flag operation, and optimizing a branch and a cycle instructions.

13. The system of claim 9, wherein the software program further causes the hardware processor to:

determine based on the degree of code obfuscation of at least one optimized code block, whether to further analyze the software program using at least one of malware signature matching and heuristic analysis.

14. The system of claim 9, wherein determining, by the hardware processor, whether the software program is malicious based on the degree of code obfuscation, further includes:

providing, by the hardware processor, the optimized code to a human malware expert for further analysis.

15. The system of claim 12, wherein to generate the optimized code block, the software program further causes the hardware processor to select one or more optimization techniques based at least on requirements of the system that performs the code optimization.

16. The system of claim 13, wherein the software program further causes the hardware processor to:

classify the malicious software program into one or more classes of malware; and performing one or more malware treatment actions.

17. A non-transitory computer-readable storage medium having computer-readable instructions stored thereon that, when executed by a hardware processor, cause the hardware processor to perform the operations of:

dividing a code of a software program into a plurality of code blocks of a predetermined size;

performing an optimization of one or more of the plurality of code blocks, wherein the optimization of a code block includes:

generating a converted code block by disassembling the code block into a low-level programming language;

generating a simplified code block by replacing complex assembly instructions in the converted code block with basic instructions;

generating a data flow model of the simplified code block;

analyzing dependencies and interrelations of code elements of the data flow model;

identifying obfuscated software code elements in the simplified code block based on the analysis of the data flow model; and generating an optimized code block by changing or removing one or more identified obfuscated code elements in the simplified code block;

determining a degree of code obfuscation of at least one optimized code block by comparing the number of instructions in the optimized code block with the number of instructions in the converted code block; and determining whether the software program is malicious based on the degree of code obfuscation of at least one optimized code block and before completing the optimization of all code blocks of the software program.

18. The medium of claim 17, further include instructions for:

determining, based on the degree of code obfuscation of at least one optimized code block, whether to further analyze the software program using at least one of malware signature matching and heuristic analysis.

19. The medium of claim 17, wherein instructions for performing an optimization of one or more of the plurality of code blocks further include one or more of instructions for:

performing sequentially the optimization of the plurality of code blocks; and performing in parallel the optimization of the plurality of code blocks.

20. The medium of claim 17, wherein instructions for disassembling the code block into the low-level programming language include instructions for disassembling the code block into assembly-language instructions to generate the converted code block.

21. The medium of claim 17, wherein instructions for generating the optimized code block include instructions for performing one or more code optimization techniques, including removing a dead code, optimizing a distributed calculation, optimizing a reverse operation, optimizing a constant calculation, optimizing a transfer instruction, optimizing a memory call, optimizing a flag operation, and optimizing a branch and a cycle instructions.

22. The medium of claim 21, wherein generating the optimized code block further includes selecting one or more optimization techniques based at least on requirements of the system that performs the code optimization.

23. The medium of claim 18, further comprising instructions for:

classifying the malicious software program into one or more classes of malware; and performing one or more malware treatment actions.

* * * * *